June 9, 1942.  W. R. ATWOOD  2,285,386
SHEET METAL WORKING TOOL
Filed Dec. 5, 1940
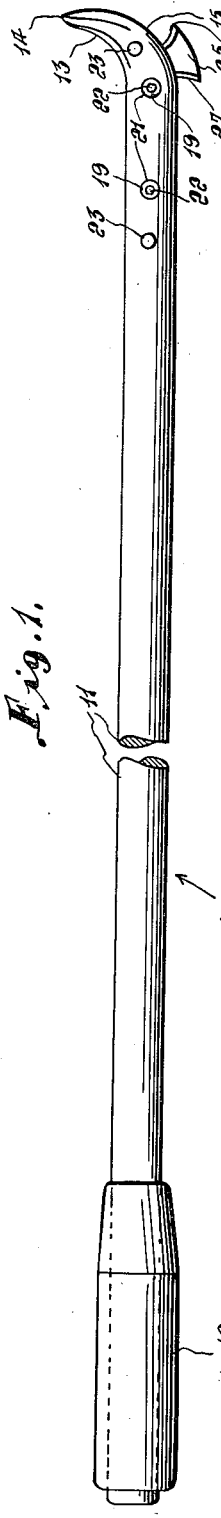
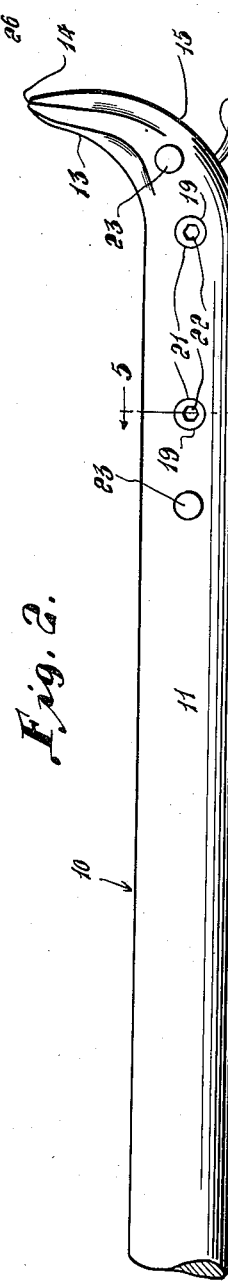
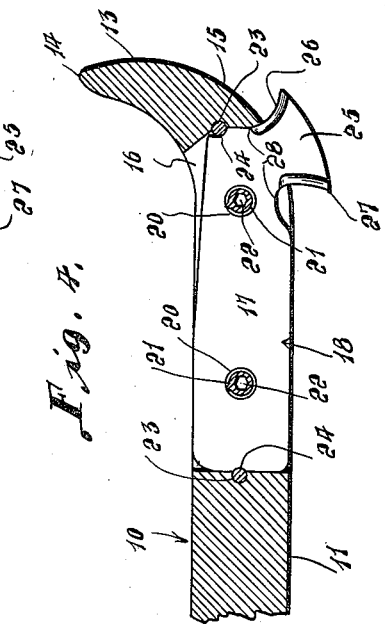
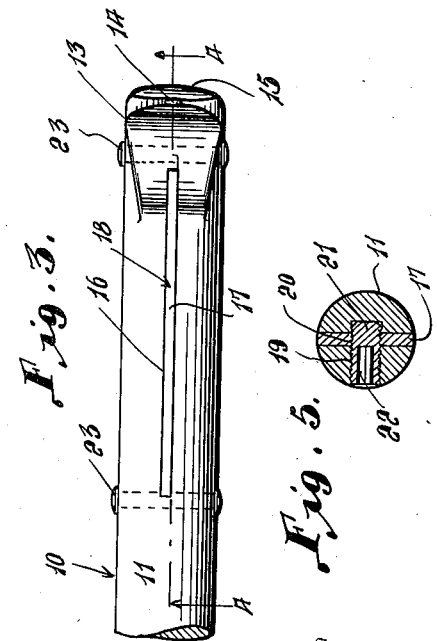
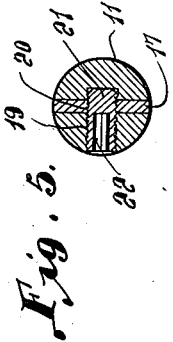
Inventor
W. R. Atwood
By L. F. Randolph
Attorney Patented June 9, 1942

2,285,386

UNITED STATES PATENT OFFICE 2,285,386

SHEET METAL WORKING TOOL

Wilmerth R. Atwood, Odessa, Tex.

Application December 5, 1940, Serial No. 368,717

4 Claims. (Cl. 30—314)

This invention relates to an improved sheet metal working tool and more particularly to a tool for use in vehicle body work.

It is a primary aim of the invention to provide a tool provided with a detachable cutting member having oppositely projecting cutting edges for cutting sheet metal on the outer or inner panels of vehicle bodies or other portions thereof.

Other objects and advantages of the invention will hereinafter become more fully apparent from the following description of the drawing, which illustrates a preferred embodiment thereof, and wherein:

Figure 1 is a side elevational view of the tool,

Figure 2 is a similar view, on an enlarged scale, of one end of the same,

Figure 3 is a fragmentary top plan view of the headed end of the tool,

Figure 4 is a longitudinal vertical sectional view taken substantially along the plane of the line 4—4 of Figure 3, and Figure 5 is a transverse sectional view taken substantially along the plane of the line 5—5 of Figure 2.

Referring more particularly to the drawing, wherein like reference characters designate like or corresponding parts throughout the different views, 10 designates generally the improved sheet metal working tool which includes an elongated shank 11 provided with a handle 12 mounted thereon and adjacent one end thereof with a portion of the shank 11 projecting beyond the outer end of the handle 12, as seen in Figure 1. The opposite end of the shank 11 is curved upwardly and tapered to form a head 13 having a restricted end 14. The outer side of the head 13 and the adjacent portion of the shank 11 combine to form a rounded portion 15 which is curved both longitudinally and transversely of the tool 10.

The shank 11, adjacent the curved head 13, is provided with a longitudinally and perpendicularly disposed slot 16 extending therethrough for receiving the shank portion 17 of a cutting member, designated generally 18. The shank 11 is provided with internally threaded recesses 19 extending inwardly and transversely thereof from one side of the shank through and beyond the slot 16, and the shank portion 17 is provided with openings 20 arranged to aline with the recesses 19 when the shank portion 17 is correctly positioned in the slot 16, as best seen in Figure 5. The registering recesses and openings 19 and 20, respectively, are adapted to receive the threaded screws 21 for detachably securing the shank 17 in the slot 16. The screws 21 are adapted to be countersunk in the recesses 19 and are provided with outwardly opening polygonal shaped sockets 22 for receiving the polygonal shaped end of a turning tool, not shown, for applying and removing said fastenings. The shank 11 is provided with rivets 23 extending transversely and horizontally therethrough and partially disposed in the ends of the slots 19 for engaging notches 24 in the ends of the shank portion 17, as best seen in Figure 4. The shank portion 17 is inserted into and removed from the slot 16 through its under side and in inserting the shank portion 17 the notches 24 will engage the rivets 23 for limiting the inward movement of the shank portion 17 relatively to the slot 16 and for correctly alining the openings 20 with the recesses 19. The rivets 23 will also prevent any upward or lengthwise movement of the shank portion 17 relatively to the slot 16 while the fastenings 21 are applied to prevent the shank portion 17 from bearing against the threads of the fastenings 21 and possibly damaging the threads when the cutting member 18 is being used, as will hereinafter become apparent. The shank portion 17 is provided with an integral blade 25 at its forward end and adjacent the curved head 13 which projects outwardly from the under side of the forward end of the slot 16 and from the curved surface 15. The blade 25 is provided with curved, outwardly projecting and outwardly diverging cutting edges 26 and 27 at the ends thereof and the shank portion 17 is provided with cut-out portions which combine with portions of the slot 16 to form recesses 28 at the inner ends of the cutting edges 26 and 27.

With the cutting member 18 removed, the tool 10 may be held by the handle 12 and the head thereof employed for driving or prying a vehicle body back to alinement or the end 14 can be used for hammering or prying out low places in a portion of a vehicle body to be straightened. The rounded surface 15 may be employed for hammering out dents or may be used as an anvil or spoon by being placed under the surface to be straightened while the opposite side of the surface is hammered with a body hammer. The tool 10 may also be used for cutting portions of a metal body by grasping the handle 12 and placing the cutting edge 27 against the portion of the metal to be cut and striking the outer side of the head 13 with a hammer. The cutting edge 26 may be similarly employed by striking the exposed end of the shank 11, as seen in Figure 1, which extends beyond the handle 12 with a hammer or other impact tool. The recesses 28 are provided to receive the fine particles of metal or shavings caused by the cutting and which are directed inwardly or toward the shank 11. The cutting edges 26 and 27 are curved to diverge outwardly relatively to one another so that the metal to be cut will be directed toward the inner ends of the cutting edges and toward the shank 11 to prevent the cutting edges from slipping out of engagement with the work while the tool is being used for cutting.

Various modifications and changes in the construction and arrangement of the parts forming the tool are contemplated and may obviously be resorted to as only a preferred embodiment of the invention has been disclosed.

I claim as my invention:

1. A tool of the character described comprising an elongated shank provided with a curved, tapered end forming the tool head, the outer side of said curved end being rounded, said shank, adjacent said curved end, being provided with a longitudinally disposed slot, and a cutting member detachably mounted in said slot and having a blade projecting therefrom, said blade having a cutting edge extending from the slot and from the outer side of said curved end, and said cutting edge being bowed inwardly and being curved to extend outwardly and toward the tool head.

2. A sheet metal working tool comprising an elongated shank provided with a handle, adjacent one end thereof, the opposite end of said shank terminating in a curved, tapered head, said shank being provided with a longitudinal slot adjacent said headed end, and a cutting member having a shank portion disposed in said slot and detachably connected to the shank, said cutting member including a blade projecting outwardly from the shank portion and having an inwardly bowed cutting edge facing away from the handle and extending into the outer side of the head.

3. A sheet metal working tool having an elongated shank, substantially circular in cross section, provided with a handle at one end and a longitudinal slot near its opposite end, and a cutter secured in the slot and having a blade projecting outwardly therefrom, said blade having a curved, inwardly bowed cutting edge extending outwardly from the tool shank, said edge being disposed to face toward the handle, the end of the tool shank, adjacent the blade, being curved in a direction away from the blade to provide an anvil portion adapted to be struck by an impact tool for forcing the cutting edge through metal to be cut thereby.

4. A sheet metal working tool having an elongated shank, substantially circular in cross section, provided with a handle at one end and a longitudinal slot near its opposite end, and a cutter secured in the slot and having a blade projecting outwardly therefrom, said blade having a curved, inwardly bowed cutting edge extending outwardly from the tool shank, said cutting edge being disposed to face away from the handle, the last mentioned end of the tool shank being curved away from the cutting edge, and said cutting edge being disposed to extend through the outer side of said curved end.

WILMERTH R. ATWOOD.